United States Patent [19]

Fock

[11] Patent Number: 5,484,851
[45] Date of Patent: Jan. 16, 1996

[54] POLYVINYL-POLYOXYALKYLENE BLOCK COPOLYMERS

[75] Inventor: Jürgen Fock, Düsseldorf, Germany

[73] Assignee: Th. Goldschmidt AG, Essen, Germany

[21] Appl. No.: 172,678

[22] Filed: Dec. 22, 1993

Related U.S. Application Data

[62] Division of Ser. No. 961,310, Oct. 15, 1992, abandoned.

[30] Foreign Application Priority Data

Oct. 23, 1991 [DE] Germany ............... 41 34 967.9

[51] Int. Cl.⁶ ............... C08F 08/34; C08F 12/08
[52] U.S. Cl. ............... 525/333.5; 525/326.7; 525/326.9; 525/329.1; 525/330.3; 525/330.4
[58] Field of Search ............... 525/333.3, 333.5, 525/326.7, 326.9, 329.1, 329.2, 330.3, 330.4

[56] References Cited

U.S. PATENT DOCUMENTS 3,978,160  8/1976  Seiler et al. ............... 525/333.3

OTHER PUBLICATIONS

Okano et al., J. Polym. Sci. Part A: PolymChem., 26, 381–391 (1988).
Uyanik et al., J. Appl. Polym. Sci., 41, 1981–1983 (1990).
Nair et al., J. Macromol. Sci. Chem., A27(6), 791–806 (1990).
Riess et al. ACS Polymer Preprints 23, 19, 1982.
O'Malley et al., "Block Polymer", Ed. S. L. Aggarwal, Plenum Press, New York, 1970.
Huynh—BA—Gia et al., J. Polym. Sci. Polym. Phys. Ed. 18, 2391, 1980.

Primary Examiner—George F. Lesmes
Assistant Examiner—Helen F. Lee
Attorney, Agent, or Firm—Anderson Kill Olick & Oshinsky

[57] ABSTRACT

A mixed block copolymer of the A-B type is prepared. The A block of the block copolymer is formed by the polymerization of compounds having vinyl groups and the B block of which is a polyoxyalkylene block, obtainable by polymerizing, first of all, monomers having vinyl groups at temperatures of 60° to 150° C. by a free radical mechanism in the presence of sufficient amounts of an initiator and an amount, which corresponds to the desired chain length, of a chain-length regulator, which carries, aside from a mercapto group, a further functional group having at least one active hydrogen and adding alkylene oxide, optionally in the presence of a known addition reaction catalyst, in an addition reaction at 20° to 180° C. onto the polymer so modified, until the desired molecular weight of block B is reached.

6 Claims, No Drawings

POLYVINYL-POLYOXYALKYLENE BLOCK COPOLYMERS

This is a divisional application of Ser. No. 07/961,310, filed Oct. 15, 1992, abandoned.

FIELD OF INVENTION

The invention relates to mixed block copolymers of the A-B type, the A block of which is formed by the polymerization of compounds having vinyl groups and the B block of which is a polyoxyalkylene block.

BACKGROUND INFORMATION AND PRIOR ART

Block copolymers of styrene or 2-vinylpyridine and ethylene oxide are known (*Encyclopedia of Polymer Science and Engineering* 2, 334). They are obtained in a two-step method by synthesizing the vinyl block A in first step by anionic polymerization of the vinyl compounds in the presence of alkyl or arylalkyl compounds, such as butyl lithium. This vinyl block A is then reacted in second step with alkylene oxide via an addition reaction.

The method of anionic polymerization of the vinyl monomers has, however, several fundamental disadvantages. See, *Encyclopedia of Polymer Science and Engineering,* 2, 330. Reagents and solvents of high purity have to be used. It is necessary to work in a high vacuum or with a highly purified inert gas. Very low temperatures must be maintained during the anionic polymerization and only a limited number of monomers can be polymerized anionically.

Block copolymers of polystyrene or polyvinylpyridine and alkylene oxides represent an interesting class of surface active compounds, which are described, for example, in *Tenside Surf. Det.* 28 (1991) 3. They are effective emulsifiers for emulsion polymerization and produce a stable polymer latex with modified surface properties, which cannot easily be achieved using conventional emulsifiers. Using these block polymers, water-soluble monomers, such as acrylamide, can be polymerized in water-in-oil microemulsions.

SUMMARY OF THE INVENTION

The invention is therefore based on the technical problem of finding novel polyvinyl-polyoxyalkylene block copolymers which are easily accessible and, at the same time, have the desired surface-active properties of polymer surfactants. In particular, a synthesis method is developed which makes use of special purification steps for the reagents and maintenance of low temperatures superfluous. By these means, the synthesis of these compounds, which have interesting application properties, is simplified and made less expensive so that these compounds can be utilized economically.

From the *J. Polym Sci., Part A: Polym. Chem.* 27 (6) 1883–90, the synthesis of hydroxy terminated poly(2-dimethylaminoethyl methacrylate) by free radical polymerization in the presence of 1-mercapto-2-ethanol is known. According to the reference, the hydroxy terminated polymers are esterified with a carboxy-functional poly(methyl methacrylate) and the hydroxy terminated polymer thus obtained constitutes a first step in the synthesis of block copolymers. The synthesis of block copolymers of the A-B type as disclosed in the present application, however, cannot be inferred from this literature reference.

OBJECTS OF THE INVENTION

An object of the invention is mixed block copolymers of the A-B type, the A block of which is formed by polymerization of compounds having vinyl groups and the B group of which is a polyoxyalkylene block, the copolymer is obtainable by first of all polymerizing monomers having vinyl groups in a known manner by a free radical reaction at temperatures of 60° to 150° C. in the presence of sufficient amounts of an initiator and amounts of a chain-length regulator corresponding to the desired chain length, the chain-length regulator having a mercapto group as well as a further functional group that has at least one active hydrogen, and adding alkylene oxide to the polymer, so modified, in an addition reaction at temperatures of 20° to 180° C., optionally in the presence of a known catalyst for such a reaction, until the desired molecular weight of Block B is reached.

Another object of the invention is using the inventive compounds as polymeric surfactants, particularly as emulsifiers for the emulsion polymerization, as polymer dispersants for polymer blends and as dispersing agent for pigments in color pastes and preparations containing pigments and/or carbon black.

DESCRIPTION OF THE INVENTION

The polymer of block A is synthesized preferably by the free radical polymerization of vinyl compounds having vinyl groups in the presence of a solvent and/or excess amounts of the monomer. After the synthesis of block A, excess monomeric vinyl compounds and any solvent present are removed partially or completely from the polymer obtained.

The chain-length regulators used are of particular importance for the object of the present invention. On one hand, they must have a mercapto group so that the free radical polymerization proceeds in the desired manner. On the other hand, they must have at least a second group with an active hydrogen to which alkylene oxide can be added in an addition reaction in the second step of the method. The chain-length regulators are thus the bridging elements which link block A with block B. Examples of such functional groups with an active hydrogen are hydroxyl, carboxyl and amino groups. The amino group can be monosubstituted with an alkyl group.

Examples of suitable chain-length regulators are mercaptoalkanols, such as 1-mercapto-2-ethanol; 1-mercapto-4-butanol; 1-mercapto-6-hexanol and mercaptomethylbenzylalcohol, mercaptocarboxylic acids, such as mercaptoacetic acid or mercaptofunctional secondary amines, such as 2-mercaptoethyl-n-butylamine. Particularly preferred is 1-mercapto-2-ethanol. In view of the higher resistance to hydrolysis of the block copolymers obtained, the mercaptoalkanols are superior to the mercaptocarboxylic acids and their use is preferred.

To achieve the desired chain length, the chain-length regulators are used in amounts of 0.001 moles to 0.5 moles per mole of compounds containing vinyl groups and preferably in amounts of 0.005 to 0.1 moles per mole of compounds containing vinyl groups.

Examples of monomers having vinyl groups are the compounds which polymerize by a free radical mechanism, such as styrene, alkylstyrene, cyclohexyl methacrylate, t-butyl acrylate, butadiene, isoprene, vinylcyclohexane, N-vinylpyrrolidone, vinyl imidazole, methyl methacrylate, butyl methacrylate, ethylhexyl methacrylate, methacrylamide or methacrylonitrile.

Preferred vinyl monomers are styrene, alkylstyrene and, particularly, methylstyrene and p-t-butylstyrene.

As initiators, known polymerization initiators, such as azodiisobutyronitrile or peroxides, such as benzoyl peroxide, cumene hydroperoxide, cyclohexanone peroxide, t-butyl peroctoate and di-t-butyl peroxide are used.

The free radical polymerization is carried out in the presence of a solvent, such as toluene, xylene, chlorinated hydrocarbons, tetrahydrofuran, dioxane or methyl ethyl ketone, or in the presence of excess amounts of the monomers and at temperatures ranging from 60° to 150° C. and particularly from 80° to 120° C.

The first step of the polymerization results in vinyl polymers which have, as a terminal group, the molecule of the chain-length regulator that is linked through the mercapto group. In the event that 1-mercapto-2-ethanol is used, the vinyl polymers have the —S—$C_2H_4$OH group as terminal group. In the event that mercaptocarboxylic acids are used as chain-length regulators, the terminal group is —S—R—COOH, R being a divalent group, usually an alkylene group. In the event that mercaptofunctional amines are used, the —S—R—$NH_2$ or —S—R—NR'H group (R=alkyl group, particularly with 1 to 4 carbon atoms) is present as terminal group. The polymers have a mean number average molecular weight of 250 to 30,000 and preferably one of 1,000 to 10,000.

The polymers are generally purified by distillation to remove excess monomeric vinyl compounds. The solvent is usually not removed in the process.

Alkylene oxide is now added via an addition reaction to the vinyl polymer so obtained, optionally in the presence of known catalysts for such reactions, at temperatures of 20° to 180° C. until the desired molecular weight is attained.

As catalysts, alkali hydroxides or alkali alcoholates are suitable, particularly when the functional group of the chain-length regulator is an —OH or a —COOH group. The water or alcohol, set free by the addition of the alkali hydroxides or the alkali alcoholares, is removed from the reaction mixture prior to the addition reaction of the alkylene oxide.

As addition reaction catalysts, it is also possible to use cationic catalysts, such as $BF_3$, $BF_3$ etherate, $SnCl_4$ and $FeCl_3$.

If the functional group of the chain-length regulator, which has the active hydrogen, is an amino group, the addition reaction of the alkylene oxide can take place without the use of a catalyst, since this functional group is already able to react with alkylene oxides without the use of a catalyst or initiator.

As alkylene oxides, ethylene oxide, propylene oxide and butylene oxide are particularly used. Since the B block generally is intended to have pronounced hydrophilic properties in order to obtain a copolymer with surface active properties, the alkylene oxide used is generally ethylene oxide by itself or an admixture of it with propylene oxide and/or butylene oxide. As a rule, the proportion of ethylene oxide predominates in the copolymer. If different alkylene oxides are to be added in the addition reaction, they can be added as a mixture with statistical distribution or separately and consecutively as a block.

The inventive block copolymers of the A-B type obtained have at the end of the B block an OH group which can be derivatized by known methods. For example, the OH group can be converted into an O-alkyl group by reaction with alkyl halide. It is furthermore possible to synthesize the corresponding sulfonates by a reaction with alkyl halides, such as allyl chloride, followed by a reaction with alkali hydrogen sulfite.

Other derivatives are formed by the reaction of the terminal OH group with a sulfating agent, such as amidosulfonic acid, which produce the corresponding sulfates.

The inventive block copolymers obtained have the desired surface active properties. They differ from the copolymers described in the *Encyclopedia of Polymer Science and Engineering* 2, 334 by the group of the chain-length regulator, which links the two blocks but evidently does not affect the surface active properties or affects them only slightly or negligibly.

The inventive block copolymers can be used in a known manner as polymer surfactants, particularly as emulsifiers for emulsion polymerizations. The emulsions, obtained by using the inventive polymer surfactants, show outstanding stability under shear load and when subjected to cold and are largely insensitive to the addition of electrolytes.

Moreover, the undesirable accumulation of coagulate and the "baking" of the polymer to the wall of the reactor can be reduced or avoided. With the help of the inventive block copolymers, microemulsions can be produced, for example, in the inverse phase.

The inventive polymers are excellent polymer dispersants for polymer blends, particularly for polystyrene or its copolymers in polyols or for polyolefins in polyols, particularly polyetherols. The inventive block copolymers, moreover, are effective pigment dispersants in color pastes for the production of pigments and/or carbon black-containing preparations. By using the inventive block copolymers, it is possible to increase clearly the pigment's absorption capacity of polyesterols and polyetherols.

The inventive method is described in greater detail by means of the following Examples 1 A to 7 A or 1 B to 12 B. In addition, some application properties of the inventive compounds are described in the application Examples I to III. It is understood that these examples are given by way of example and not by way of limitation.

EXAMPLE 1 A

Synthesis of an α-Hydroxypolystyrene (not of the invention)

Xylene (100 g) is heated to 120° C. under a blanket of nitrogen in a reactor that is equipped with a stirrer. Over a period of 3 hours, while maintaining a temperature of 120° C., a mixture of 1560 g (approximately 15 moles) of styrene, 78.1 g (approximately 1 mole) of 1-mercapto-2-ethanol, 4.1 g of azodiisobutyrodinitrile and 310 g of dry xylene is added. At the end of the addition of the mixture, the reaction is continued for about 15 minutes. Subsequently, 0.16 g of methylhydroquinone are added.

Excess styrene and 1-mercapto-2-ethanol are separated from xylene by vacuum fractionation (40° to 50° C./20 torr). A colorless, viscous solution of the α-hydroxypolystyrene in xylene is obtained in a concentration of about 62% by weight.

Gel chromatographic analysis reveals a number average molecular weight $\overline{M}_{nGPC}$ of 870 and a mass average molecular $\overline{M}_{wGPC}$ of 1380; the nonuniformity coefficient accordingly is 1.59. By vapor pressure osmometry, a value of $\overline{M}_{nOsm.}$ of 820 is obtained. With the help of the $M_{OHZ}$ molecular weight of 875, calculated from the hydroxyl number, a functionality of $f_{GPC}=0.99$ can be calculated from the gel chromotographic data and a functionality of $f_{Osm.}0.94$ from the vapor pressure osmometry data. The gel permeation chromatogram shows only one maximum.

ethanol and the xylene, the molecular weights, the nonuniformity coefficient, as well as the functionalities are given in Table 1.

TABLE 1

| Example | | Monomer | 1-Mercapto-2-ethanol | Amount of | $\overline{M}_n$ | | $\overline{M}_n$ | M | $f_1$ | $f_2$ |
|---|---|---|---|---|---|---|---|---|---|---|
| No. | Type | Amount (g)/(moles) | Amount (g)/(moles) | Xylene (g) | GPC | $\overline{M}_w/\overline{M}_n$ | Osm. | OHZ | GPC | Osm. |
| 1A | St | 1560/15 | 78.1/1.0 | 100 + 310 | 870 | 1.59 | 820 | 875 | 0.99 | 0.94 |
| 2A | St | 1560/15 | 19.5/0.25[1)] | 100 + 380 | 3070 | 1.97 | 2915 | 3105 | 0.99 | 0.94 |
| 3A | St | 1560/15 | 11.7/0.15[1)] | 100 + 450 | 4950 | 2.18 | 4710 | 4750 | 1.04 | 0.99 |
| 4A | St | 1560/15 | 5.9/0.076[1)] | 100 + 500 | 9650 | 2.67 | — | — | — | — |
| 5A | St | 1560/15 | 2.9/0.037[1)] | 100 + 550 | 18500 | 2.95 | — | — | — | — |
| 6A | tBSt | 2400/15 | 19.5/0.25[1)] | 100 + 380 | 2935 | 1.51 | 2820 | 3120 | 0.94 | 0.90 |
| 7A | St/tBSt | 780/7.5 +1200/7.5 | 78.1/1.00 | 100 + 310 | 1160 | 1.60 | 905 | 1180 | 0.98 | 0.96 |

Legend:
St = styrene
tBSt = p-t-butyl styrene
[1)]instead of 0.2% by weight, 0.1% by weight azodiisobutyronitrile

EXAMPLES 2 A TO 5 A

Synthesis of α-Hydroxypolystyrene of Different Molecular Weights

Basically, the method of Example 1A is followed, with the exception that the amount of 1-mercapto-2-ethanol and xylene are varied, as shown in Table 1. Moreover, only 0.1% by weight of azodiisobutyronitrile is used instead of 0.2% by weight.

Furthermore, the $\overline{M}_{nGPC}$ molecular weight and the nonuniformity coefficient $\overline{M}_w/\overline{M}_{nGPC}$, calculated from gel chromatographic data, the $\overline{M}_{nOsm.}$ and $M_{OHZ}$ molecular weights, calculated from vapor pressure osmometry and hydroxyl determination data, and the $f_{GPC}$ and $f_{Osm.}$ functionalities are given in Table 1. The $f_{Osm.}$ is calculated from $\overline{M}_{nGPC}$ and $\overline{M}_{nOsm.}$ number average molecular weights and from the molecular weight that is obtained from the hydroxyl number.

EXAMPLE 6 A

Synthesis of α-Hydroxypoly-p-t-butylstyrene

Basically, the method of Example 1A is followed, with the exception that p-t-butylstyrene is used instead of styrene. The amount of monomer, the amounts of 1-mercapto-2-ethanol and of xylene and the molecular weights, the nonuniformity coefficients and the functionalities are given in Table 1. Instead of 0.2% by weight, only 0.1% by weight of azodiisobutyronitrile is used.

EXAMPLE 7 A

Synthesis of α-Hydroxystyrene/p-t-butylstyrene Copolymer

Basically, the method of Example 1 A is followed, with the exception that a 1:1 molar mixture of styrene and p-t-butylstyrene is used instead of styrene. The type and amount of the monomers, the amounts of 1-mercapto-2-

EXAMPLE 1 B

Synthesis of a Polystyrene/Polyethylene Oxide Block Copolymer (of the invention)

The solution of 870 g (approximately 1 mole) of the α-hydroxypolystyrene of Example 1 A in 870 g of xylene and 35.0 g (approximately 0.5 moles) of potassium methylate are added to a well dried stainless steel reactor, which is equipped with a stirrer. By azeotropic distillation, traces of moisture, as well as methanol are largely removed together with a portion of the xylene used. After carefully flushing with pure, dry nitrogen, the temperature is raised to 80° C. and 435 g of ethylene oxide (approximately 19.9 moles) are added with stirring at such a rate, that the temperature does not exceed 85° C. and the pressure does not exceed 6 bar inside the reactor. After all of the ethylene oxide has been introduced, the temperature is maintained at 80° C., until a constant pressure indicates the end of the reaction. Finally, unreacted monomers are removed by partial distillation under vacuum at 80° to 90° C.

The yellowish product obtained is mixed with approximately 100 g of water and subsequently brought to a pH of approximately 6 to 7 with 30% phosphoric acid. The water is removed by vacuum distillation and the precipitated salt by filtration in the presence of a filter aid. A slightly yellowish, viscous product is obtained.

The molecular weight, determined from the hydroxyl number assuming a functionality of 1, is 1655. From gel chromatographic analysis, a number average molecular weight $\overline{M}_n$ of 1655 and a mass average molecular weight $\overline{M}_w$ of 2035 are obtained; the nonuniformity coefficient $\overline{M}_w/\overline{M}_n$ accordingly is 1.23. The gel permeation chromatogram shows only one maximum.

EXAMPLES 2 B TO 9 B

Synthesis of Different Polystyrene/Polyoxyalkylene Block Copolymers (of the invention)

Basically, the method of Example 1 B is followed, with the exception that α-hydroxypolystyrenes of different molecular weight (see Examples 1 A to 5 A) and ethylene oxide, as well as mixtures of ethylene oxide, propylene oxide and butylene oxide are used in different amounts. The alkoxylation of the higher molecular weight α-hydroxypolystyrenes is carried out in a xylene solution. Aside from the type and amount of the vinyl polymer, the type and amount of the alkylene oxide is given in Table 2, the amount of alkylene oxide being expressed in moles per mole of vinyl polymer. In addition, the number average molecular weight $\overline{M}_n$, obtained from gel permeation chromatography, and the nonuniformity coefficient $\overline{M}_w/\overline{M}_n$, as well as the molecular weight $M_{OHZ}$, obtained from the hydroxyl number assuming a functionality of 1, are given in this Table.

TABLE 2

| Example No. | α-Hydroxy Polymer | | | Alkylene Oxide Added On[1] | | | $\overline{M}_n$ GPC | $\overline{M}_w/\overline{M}_n$ GPC | M OHZ |
|---|---|---|---|---|---|---|---|---|---|
| | From Example No. | Type | Amount (g) | EO (moles) | PO (moles) | BO (moles) | | | |
| 1B | 1A | PSt | 870 | 19.9 | — | — | 1655 | 1.23 | 1665 |
| 2B | 1A | PSt | 870 | 4.0 | — | — | 990 | 1.40 | 975 |
| 3B | 1A | PSt | 870 | 59.7 | — | — | 3255 | 1.42 | 3020 |
| 4B | 1A | PSt | 870 | 10.0 | 10.0 | — | 1800 | 1.32 | 1700 |
| 5B | 2A | PSt | 1025 | 69.8 | — | — | 5730 | 1.73 | 5570 |
| 6B | 2A | PSt | 1025 | 13.9 | — | — | 3420 | 1.74 | 3320 |
| 7B | 3A | PSt | 990 | 112.5 | — | — | 9200 | 1.97 | 8400 |
| 8B | 4A | PSt | 965 | 44.0 | — | — | 10980 | 2.35 | — |
| 9B | 5A | PSt | 925 | 84.2 | — | — | 21500 | 2.82 | — |
| 10B | 6A | PBSt | 980 | 66.7 | — | — | 5430 | 1.85 | 5120 |
| 11B | 6A | PBSt | 980 | 33.3 | 33.3 | — | 5910 | 1.82 | 5660 |
| 12B | 7A | St/tBSt-Co | 1160 | 19.5 | 3.4 | — | 2100 | 1.42 | 2030 |

[1]based on 1 mole of α-hydroxy polymer
Key for Table 2:
PSt = α-hydroxypolystyrene
PBSt = poly-p-t-butylstyrene
St/tBSt-Co = styrene/p-t-butylstyrene copolymer
EO = ethylene oxide
PO = propylene oxide
BO = Butylene oxide polymer. In addition, this Table also contains the number average molecular weights $\overline{M}_n$ obtained from gel permeation chromatography, and the nonuniformity coefficient, as well as the molecular weight obtained from the hydroxyl number assuming a functionality of 1.

EXAMPLES 10 B AND 11 B

Synthesis of Different
Poly-t-butylstyrene/Polyoxyalkylene Oxide Block
Copolymers (of the invention)

Basically the method of Example 1 B is followed, with the exception that, instead of α-hydroxypolystyrene, α-hydroxypoly-p-t-butylstyrene (Example 6 A) as well as various alkylene oxides are used in different amounts. Aside from the amount by weight of the vinyl polymer, the type and amount of the alkylene oxide are given in Table 2, the amount of alkylene oxide being expressed in moles per mole of the vinyl polymer. In addition, the number average molecular weight $\overline{M}_n$, obtained from gel permeation chromatography, and the nonuniformity coefficient $\overline{M}_w/\overline{M}_n$ and the molecular weight $M_{OHZ}$, obtained from the hydroxyl number assuming a functionality of 1, are given in this Table.

EXAMPLE 12 B

Synthesis of a (Styrene/p-t-Butylstyrene
Copolymer) Polyethylene Oxide Block Copolymer
(of the invention)

Basically, the method of Example 1B is used, with the exception that, instead of α-hydroxypolystyrene, α-hydroxystyrene-p-t-butylstyrene copolymer (Example 7 A) is used. In Table 2, the amount by weight of the vinyl polymer and the amount of alkylene oxide are given, the amount of alkylene oxide being expressed in moles per mole of the vinyl polymer. In addition, the number average molecular weight $\overline{M}_n$, obtained from gel permeation chromatography, and the nonuniformity coefficient $\overline{M}_w/\overline{M}_n$, as well as the molecular weight $M_{OHZ}$, obtained from the hydroxyl number assuming a functionality of 1, are given in this Table.

EXAMPLE 1 C

Synthesis of a Polystyrene/Polyethylene Oxide
Block Block Copolymer with a Terminal
Ammonium Sulfate Group The polystyrene/polyethylene oxide block copolymer (1030 g, approximately 0.5 moles) of Example 1 B is dissolved in 250 g of toluene and, to remove the water, the toluene is distilled off once again under vacuum at temperatures ranging from 80° to 115° C. Subsequently, 50.4 g (approximately 0.52 moles) of amidosulfonic acid are added over a period of about 0.5 hours at 115° C. under pure nitrogen, after which the temperature is raised to 120° C. for 2 hours. Finally, after cooling to 70° C., the product is neutralized to a pH of approximately 7 by the addition of approximately 2.5 g of 35% aqueous ammonium hydroxide solution. From the $C^{13}$-NMR spectroscopic determination of the hydroxyl number, the conversion is calculated to be 96% of the theoretical.

EXAMPLE 2 C

Synthesis of a Polystyrene/Polyethylene Oxide
Block Copolymer With a Terminal Sodium
Sulfonate Group The polystyrene/polyethylene oxide block copolymer of Example 1 B (1030 g, approximately 0.5 moles) is dried as in Example 1 C. Subsequently, 12 g (approximately 0.5 moles) of metallic sodium is added under pure nitrogen in small portions over 3 hours at 105° C. After a subsequent sojourn time of approximately 3 hours at 105° C., the reaction is completed. Thereafter, at a temperature of 70° C., 45.3 g (approximately 0.6 moles) of allyl chloride are added dropwise to the alcoholate formed, after which the temperature is raised to 120° C. and stirring is continued for 0.5 hours. The excess allyl chloride is distilled off over a period of 3 hours at 100° C.

For the neutralization, 100 g of water are added at 80° C. and the pH is adjusted to a value of approximately 7 with 30% phosphoric acid. After the addition of 10 g of Celite® T 208 as filter aid, the water is distilled off at 110° C. and 10 torr and the product is subsequently filtered. From the determination of the hydroxyl number, the conversion is calculated to be 92% of the theoretical.

The etherified product obtained (1067 g, approximately 0.5 moles) is dissolved in a mixture of 1,700 g of water and 630 g of ethanol. To this solution, 0.05 g of manganese acetate are added. Subsequently, a solution of 104.5 g (approximately 0.55 moles) of $Na_2S_2O_5$ in 210 g of water is added dropwise over a period of 3 hours, air that contains oxygen being passed in at the same time. During the addition of the bisulfite, the pH is maintained between 7 and 7.5 by the careful addition of 30% aqueous sodium hydroxide solution. Water is subsequently distilled off at 80° C. and 10 torr and the product is diluted with 200 g of toluene and filtered in the presence of 10 g of Celite® T 208. From the sulfur determination by elementary analysis, the conversion is found to be 91% of the theoretical.

The following examples serve to demonstrate the application properties of the inventive compounds.

EXAMPLE I

Preparation and Evaluation of a Pigment Paste for Dyeing Polyurethane Foams

Paint-grade carbon black (7.5 g), with a BET surface area of 45 m²/g, is dispersed for 30 minutes on a shaker with glass spheres having a diameter of 2 mm in 42.5 g of a 6% solution of the inventive block copolymer of Example 2 B in a polyester based on adipic acid and 1,2-dihydroxypropane.

A very homogeneous, flowable paste is obtained which is distinguished by the high flocculation resistance. It is suitable particularly for dyeing polyurethane foams.

EXAMPLE II

Preparation and Evaluation of a Pigment Paste for Dyeing Polyester Polyurethane Foams A copper phthalocyanine of the α modification (9 g) is mixed with a solution of 25 g of the block copolymer of Example 12 B in 400 g of a polyester based on phthalic acid, triethylene glycol and isononyl alcohol. The mixing is carried out in a continuously operating stirrer mill in the presence of steel beads with a diameter of 2 mm.

A very well flowing pigment paste is obtained, with which a great depth of shade is obtained in polyester polyurethane foams.

EXAMPLE III

Preparation and Evaluation of a Toner Formulation

Toners are formulations which are used in electrostatic imaging systems. In these formulations, additives are used which increase the refraction. These additives effectively bond salts which produce a positive or negative charge in the toner particles. In addition, the compounds must not be toxic and must be thermally stable and homogeneously dispersible. This example shows the preparation of a positively charged toner formulation.

Carbon black (6 g, Regal® 300) and 10 g of the block copolymer of Example 8 B are mixed with 1 g of potassium rhodanide. Subsequently, the preliminary mixture is homogenized in the melt with 84.6 g of polystyrene (Styrene® 686).

The resulting mixture is now mixed with a carrier of ferrite particles coated with vinyl fluoride/vinyl chloride copolymer (FPC 461). With the resulting preparation, a positive tribo-electrostatic charge of more than 32 microcoulombs is obtained.

EXAMPLE IV

Preparation and Evaluation of an Emulsion Polymer

A mixture of 500 g deionized water 1.72 g sodium dodecyl sulfate 1.32 g sodium pyrophosphate 3.3 g acrylamide 46.7 g styrene 50.2 g n-butyl acrylate 3.0 g acrylic acid 9.66 g potassium peroxydisulfate, dissolved in 140.2 g of water is stirred in a 2 L reactor under pure nitrogen at 75° C. One hour after the start of the polymerization, 7 g of the block copolymer of Example 1 C, dissolved in 35 g of water, are added. Subsequently, over a period of 6 hours, a mixture of 259.2 g styrene 281.8 g n-butyl acrylate 16.9 g acrylic acid is added dropwise.

At the end of the polymerization, the temperature is maintained at 75° C. for a further 2 hours.

The dispersion obtained has solids content of approximately the average particle diameter is about 0.12 μm, the coagulate portion, determined by filtration with the help of a 75 μm screen and subsequent drying, is 0.005% and the proportion on the reactor wall is 0.010%.

In a comparison experiment, 7 g of nonylphenol ethoxylate with 9 units of ethylene oxide are used instead of the inventive block copolymer. The coagulate portion in this case is 0.1% and the amount found on the reactor wall is 0.5%.

I claim:

1. A process of making a mixed block copolymer of the A-B type, wherein block A is formed by polymerization of compounds having vinyl groups and wherein block B is a polyoxyalkylene block, comprising the steps of polymerizing monomers having vinyl groups in presence of sufficient amount of an initiator and a chain-length regulator which, in addition to a mercapto group, comprises a functional group having at least one active hydrogen, said polymerization being carried out at a temperature of about between 60° C. to 150° C. by a free radical mechanism to obtain a modified polymer; and subjecting the said modified polymer to an addition reaction with an alkylene oxide at a temperature of about between 20° to 180° C., said addition reaction being carried out optionally in the presence of an addition inducing catalyst until the desired molecular weight of block B is reached.

2. The process of claim 1, further comprising the steps of forming block A by a free radical polymerization of vinyl compounds having vinyl groups in the presence of at least one of a) solvent, and b) excess amount of the monomer, excess monomeric vinyl compounds and any solvent present being at least partially removed from the polymer obtained after the synthesis of block A.

3. The process of claim 1 or 2, further comprising that block A is formed by the polymerization of at least one of the compounds selected from the group comprising styrene and alkylstyrene.

4. The process of claim 1, further comprising polymerizing the monomers having vinyl groups in the presence of a chain-length regulator having at least one of the functional groups selected from the group consisting of hydroxyl, carboxyl and monoalkyl-substituted amino group aside from a mercapto group.

5. The process of claim 1, further comprising carrying out the polymerization in the presence of 1-mercapto-2-ethanol as chain-length regulator.

6. The process of claim 1, further comprising that block B is formed from at least one of the group consisting of oxyethylene, oxypropylene and oxybutylene units in block arrangement or in statistical distribution.

* * * * *